United States Patent
Espiritusanto et al.

(10) Patent No.: US 11,914,504 B1
(45) Date of Patent: Feb. 27, 2024

(54) PERFORMING PHYSICAL EXPERIMENTS BASED ON AUTOMATICALLY-GENERATED TESTING SCRIPTS

(71) Applicant: STARBUCKS CORPORATION, Seattle, WA (US)

(72) Inventors: Rachel J. Espiritusanto, Auburn, WA (US); Constance J. Wang, Bellevue, WA (US); Andrew M. Greenleaf, Seattle, WA (US); Christopher M. Miller, Seattle, WA (US); Marshall G. Frerichs, Seattle, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/214,883

(22) Filed: Jun. 27, 2023

(51) Int. Cl.
G06F 11/36 (2006.01)
G06F 3/048 (2013.01)

(52) U.S. Cl.
CPC .......... *G06F 11/3684* (2013.01); *G06F 3/048* (2013.01); *G06F 11/3696* (2013.01)

(58) Field of Classification Search
CPC .... G06F 11/3684; G06F 11/048; G06F 3/048; G06F 11/3696
See application file for complete search history.

(56) References Cited

U.S. PATENT DOCUMENTS

| | | | | |
|---|---|---|---|---|
| 5,014,208 A | * | 5/1991 | Wolfson | G05B 19/41835 700/121 |
| 6,427,000 B1 | * | 7/2002 | Mumford | H04M 3/51 706/920 |
| 6,571,358 B1 | * | 5/2003 | Culotta | H04Q 3/54591 370/242 |
| 7,039,899 B1 | * | 5/2006 | Quiroga | G06F 11/3684 717/124 |
| 7,490,319 B2 | * | 2/2009 | Blackwell | G06F 11/3664 717/124 |
| 7,552,424 B1 | * | 6/2009 | Bischof | G06F 11/006 714/39 |
| 7,756,902 B2 | * | 7/2010 | Lin | G06Q 10/08 360/137 |
| 9,753,839 B2 | * | 9/2017 | Balakrishnan | G06F 11/3672 |
| 9,815,191 B2 | * | 11/2017 | Oleynik | A47J 36/321 |
| 10,140,820 B1 | * | 11/2018 | Zalewski | G07G 1/0072 |
| 10,417,115 B1 | * | 9/2019 | Klein | G06F 9/45512 |
| 11,117,253 B2 | * | 9/2021 | Oleynik | A47J 36/321 |
| 11,243,521 B2 | * | 2/2022 | Cella | B62D 15/0215 |

(Continued)

*Primary Examiner* — Tadesse Hailu
(74) *Attorney, Agent, or Firm* — Kilpatrick Townsend & Stockon LLP (57) ABSTRACT

Physical experiments can be performed based on automatically-generated testing scripts according to some examples described herein. For example, a system can generate a sample set based on demand data collected from a group of manufacturing locations. The system can also generate a graphical user interface that includes graphical options through which a user can select settings for a testing script to be used in a physical test environment. The system can receive the settings from the user through the graphical user interface. The system can then generate the testing script based on the sample set and the settings, and provide the testing script for use in executing a physical experiment in the physical test environment.

21 Claims, 6 Drawing Sheets

(56) References Cited

U.S. PATENT DOCUMENTS

| | | | |
|---|---|---|---|
| 11,687,776 B2* | 6/2023 | Jeong | G06F 16/951 |
| | | | 706/15 |
| 2002/0082924 A1* | 6/2002 | Koether | G06Q 30/04 |
| | | | 705/15 |
| 2006/0036907 A1* | 2/2006 | Inscoe | G06F 11/263 |
| | | | 714/E11.177 |
| 2006/0167577 A1* | 7/2006 | Clark | G06F 8/71 |
| | | | 700/97 |
| 2014/0047417 A1* | 2/2014 | Kaasila | H04L 43/14 |
| | | | 717/135 |
| 2015/0247190 A1* | 9/2015 | Ismagilov | C12Q 1/6851 |
| | | | 435/6.15 |
| 2015/0331779 A1* | 11/2015 | Subramaniam | G06F 11/3688 |
| | | | 717/124 |
| 2018/0232352 A1* | 8/2018 | Fulford | G06F 16/9577 |
| 2019/0213607 A1* | 7/2019 | Eppley | G06F 16/904 |
| 2019/0381654 A1* | 12/2019 | Oleynik | A47J 36/321 |
| 2021/0209011 A1* | 7/2021 | Sheshadri | G06F 40/20 |
| 2022/0012168 A1* | 1/2022 | Challa | G06F 11/3684 |
| 2022/0154176 A1* | 5/2022 | Wong | G01N 35/1081 |
| 2022/0205033 A1* | 6/2022 | Reed | G16B 50/20 |

* cited by examiner

| PROJECT NAME: | TEST DATE(S): | REQUESTED BY: | PREPARED BY: | | | | |
|---|---|---|---|---|---|---|---|
| Order # | Order Time | Customer | Channel | Tx Item# | SKU | Item | Modifiers |
| 1 | 00:00 | Collin | MOP | 1 | 11002666 | Grande Java Chip Frappuccino® Blended Coffee | |
| 2 | 00:18 | Zoe | MOP | 1 | 11094364 | Sausage, Cheddar & Egg Sandwich | |
| 3 | 00:18 | Maia | MOP | 1 | 110564 | Grande Iced Caffè Americano | |
| | | | | 2 | 11005330 | Doppio Iced Espresso | |
| 4 | 01:05 | Nash | Café | 1 | 106509 | Tall Iced Coffee | |
| | | | | 2 | 135609 | Chai Tea Latte Grande | |
| 5 | 01:21 | Enzo | MOP | 1 | 11116470 | Impossible™ Breakfast Sandwich | |
| 6 | 01:36 | Lilliana | MOP | 1 | 11039079 | Pumpkin Loaf | |
| | | | | 2 | 126197 | Tall Caramel Macchiato | |
| | | | | 3 | 148690 | Grande White Chocolate Mocha | |
| 7 | 02:29 | Adelina | MOP | 1 | 135613 | Iced Tazo® Classic Chai Tea Latte Grande | |
| 8 | 02:41 | Rory | Café | 1 | 155347 | Grande Iced Caramel Macchiato | |
| | | | | 2 | 153122 | Venti Iced White Chocolate Mocha | |
| 9 | 03:08 | Grayson | MOP | 1 | 135610 | Chai Tea Latte Venti | |
| 10 | 03:52 | Alijah | Café | 1 | 11051828 | Grande Strawberry Acai Starbucks Refreshers™ Beverage | |
| 11 | 04:13 | Lilliana | Café | 1 | 144646 | Venti Iced Coffee | |
| | | | | 2 | 11104540 | Spinach, Feta & Egg White Wrap | |

Produced for TRYER Lab Testing on 4/25/2023 using SCHELAv2023.3

SCRIPT ID: SCHELA_2023_04_25_104416 - PAGE 1 OF 16

PERFORMING PHYSICAL EXPERIMENTS BASED ON AUTOMATICALLY-GENERATED TESTING SCRIPTS

TECHNICAL FIELD

The present disclosure relates generally to generating test scripts. More specifically, but not by way of limitation, this disclosure relates to performing physical experiments based on automatically-generated testing scripts.

BACKGROUND

Many industries perform physical experiments to derive information about a subject of interest. The physical experiments may involve one or more human- or robotic-testers performing physical activities, such as operating physical equipment, in a physical test environment. For example, an entity may create a physical test environment that is a simulated manufacturing environment. The simulated manufacturing environment can be designed to mimic a real manufacturing location. The simulated manufacturing environment may include manufacturing equipment (e.g., mixers, tanks, centrifuges, generators, compressions, lifts, welders, conveyor belts, etc.) configured similarly to how it would be in a real manufacturing location, so as to simulate the real-world operation of the manufacturing equipment. The testers can then perform various experiments in the physical test environment, for example to detect and resolve problems.

SUMMARY

One example of the present disclosure includes a method. The method can involve generating a sample set based on demand data collected from a plurality of manufacturing locations; generating a graphical user interface that includes graphical options through which a user can select settings for a testing script to be used in a physical test environment; receiving the settings from the user through the graphical user interface; generating the testing script based on the sample set and the settings; and providing the testing script for use in executing a physical experiment in the physical test environment. Some or all of the method can be implemented by one or more processors.

Another example of the present disclosure can include a system comprising one or more processors and one or more memories. The one or more memories can include instructions that are executable by the one or more processors for causing the one or more processors to perform operations. The operations can include generating a sample set based on demand data collected from a plurality of manufacturing locations; generating a graphical user interface that includes graphical options through which a user can select settings for a testing script to be used in a physical test environment; receiving the settings from the user through the graphical user interface; generating the testing script based on the sample set and the settings; and providing the testing script for use in executing a physical experiment in the physical test environment.

Yet another example of the present disclosure can include a non-transitory computer-readable medium comprising program code that is executable by one or more processors for causing the one or more processors to perform operations. The operations can include generating a sample set based on demand data collected from a plurality of manufacturing locations; generating a graphical user interface that includes graphical options through which a user can select settings for a testing script to be used in a physical test environment; receiving the settings from the user through the graphical user interface; generating the testing script based on the sample set and the settings; and providing the testing script for use in executing a physical experiment in the physical test environment.

DETAILED DESCRIPTION

In various industries, manufacturers may test their equipment and processes using testing scripts. These scripts are normally created manually by a human, which is slow and susceptible to errors. These scripts are also generally created based on limited information, such as information about a single day from a single manufacturing location. This can result in physical experiments that are location-specific, rather than broadly applicable. Because of the limited applicability of each experiment, the tester may need to conduct a large number of experiments using many different scripts, which are manually created from different information collected from different manufacturing locations, to develop a wide enough collection of test results to derive meaningful insights. Performing such a large number of repeated experiments can consume significant time and resources, because each individual test takes time to complete and requires the operation of physical equipment that consumes processing power, memory, electricity, etc. Performing such a large number of repeated experiments may also produce suboptimal (e.g., inaccurate or conflicting) test results. This can make it challenging to perform trend analytics or identify the root cause of a problem detected in one or more experiments.

Some examples of the present disclosure can overcome one or more of the abovementioned problems performing physical experiments based on automatically-generated testing scripts. For example, a system can provide a graphical user interface through which a user can select settings for a testing script for use in a physical test experiment. The system can also generate a sample set based on demand data collected from multiple real locations. A real location can be a manufacturing location that is not primarily designed for testing purposes (e.g., a consumer-facing manufacturing location). The system can then automatically generate the testing script based on the sample set and the selected settings. The testing script can serve as instructions as to how to conduct the physical experiment. In some examples, the testing script can be configured to mimic real-life activity at a real location. For example, the testing script can include a sequence of physical activities designed to simulate real activity at a real location. After generating the testing script, the system can provide the testing script to a human tester or a robotic tester for use in executing a physical experiment in a physical test environment. The physical test environment can be primarily designed for testing purpose and therefore may not be consumer facing. In this way, the system can automatically generate and provide testing scripts for use in performing physical experiments, where the testing scripts are derived from data collected across multiple manufacturing locations. This can help standardize the testing scripts so that the corresponding experiments are more broadly applicable, and so that the testing scripts can be repeatedly applied in a consistent way.

To generate the sample set, the system can begin by collecting the demand data from the multiple real locations, which may be real manufacturing locations. A manufacturing location can be any location at which physical objects (e.g., electrical devices, mechanical devices, edible products such as drinks and food, or other items) are created by combining one or more sub-components together. The demand data can include time series information indicating the demand for various physical objects at each real location over a prior time window, such as the last 365 days. Based on the demand data, the system can determine a set of the physical objects that satisfy a first set of filter criteria. The system can also determine, based on the demand data, a set object modifiers that satisfy a second set of filter criteria. An object modifier can be an optional change to a physical object (e.g., from its default arrangement) at the request of an entity. The system can then generate the sample set to include the set of physical objects that satisfy the first set of filter criteria and the object modifiers that satisfy the second set of filter criteria. By applying these techniques, a sample set can be produced that includes a limited set of objects and modifiers that satisfy their respective criteria. This can help focus the sample set on the most relevant information for testing purposes.

Some examples described herein can allow for repeatable and controlled testing and results, thereby improving test quality and efficiency. The testing scripts can be digestible for experimental testing and yield results that can be replicated and analyzed. These techniques can also provide the ability to trace back test results and identify the root cause of results in testing, and allow for aggregation of test result data for use in performing relational data analytics such as trend analytics.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
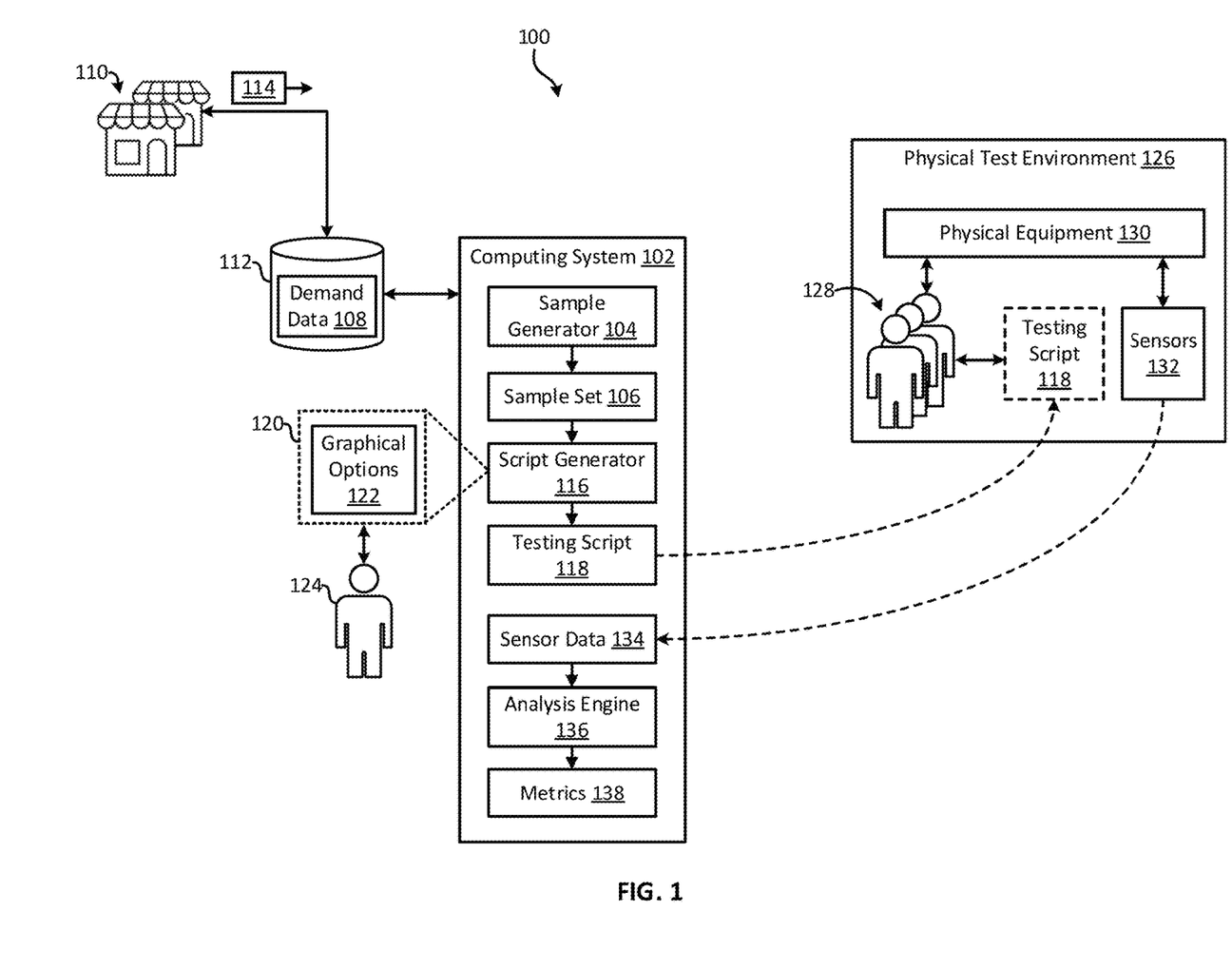
FIG. 1 shows a block diagram of an example of a system for performing physical experiments based on automatically-generated testing scripts according to some aspects of the present disclosure.

FIG. 1 shows a block diagram of an example of a system 100 for performing physical experiments based on automatically-generated testing scripts according to some aspects of the present disclosure. The system 100 includes a computing system 102 that can have any number and combination of computing devices. Examples of the computing devices can include desktop computers, laptop computers, servers, and mobile phones. In some examples, the computing system 102 can be a distributed computing system that includes multiple computing devices in networked communication with one another. In some such examples, the computing system 102 may be a cloud computing environment, a computing cluster, or a data grid.

The computing system 102 can include a sample generator 104 configured to generate a sample set 106 based on demand data 108 collected from multiple real locations 110. The real locations 110 can be real manufacturing locations that are producing real products for customers. Examples of the real locations 110 can include stores, such as coffee shops or restaurants; industrial manufacturing plants or factories; etc. Each of the real locations 110 can be in a different geographical location from the other real locations 110. Each of the real locations 110 can provide its own respective set of demand data 114 that indicates demand for (e.g., requests or sales of) one or more physical objects over a predefined time period, such as a prior time window. For example, the real locations 110 can transmit respective sets of demand data to the computing system 102. The respective sets of demand data can be time series information that indicates the demand for the same set of physical objects over the last two years at the real locations 110. The respective sets of demand data can be transmitted by the real locations 110 to the computing system 102 via one or more networks, such as a private network and/or a public network. An example of a private network can be a local area network (LAN), and an example of a public network can be the Internet. The computing system 102 can receive and store each respective set of demand data in a datastore 112.

After obtaining the demand data 108, the computing system 102 can execute the sample generator 104 to process the demand data 108 to generate the sample set 106. This process is described in greater detail later on with respect to FIG. 2, but can generally involve applying a series of filtering steps to the demand data 108 to identify physical objects and/or object modifiers of interest. For example, the computing system 102 can analyze the demand data 108 to identify a set of the physical objects that satisfy a first set of filter criteria. Additionally or alternatively, the computing system 102 can analyze the demand data 108 to identify a set of the object modifiers that satisfy a second set of filter criteria, which can be the same as or different from the first set of filter criteria. As mentioned earlier, an object modifier can be an optional change to physical object's default characteristics at the request of an entity, such as a customer. One example of an object modifier can include adding a specific ingredient to or removing a specific ingredient from a drink. Based on the identified set of physical objects and/or the identified set of object modifiers, the computing system 102 can then generate the sample set 106. For example, the computing system 102 can include the identified set of physical objects and/or the identified set of object modifiers in the sample set 106. As a result of this process, the sample set 106 may only contain a limited subset of the physical objects and/or object modifiers in the original demand data 108 that satisfy the respective criteria.

After generating the sample set 106, the computing system 102 can execute a script generator 116. The script generator 116 can generate a testing script 118 based on the sample set 106 and settings selected by a user 124. More specifically, the script generator 116 can generate a graphical user interface 120 for display to the user 124. The graphical user interface 120 can include graphical options 122 through which the user 124 can select settings for the testing script 118. An example of the graphical user interface 120 is described in greater detail later on with respect to FIG. 3. The user 124 can interact with the graphical options 122 to select their desired settings (e.g., setting values). This can allow the user 124 to customize the testing script 118 for different scenarios and to control for different variables. After selecting their desired settings, the user 124 can select a button in the graphical user interface 120 to trigger the automated generation of the testing script 118. The script generator 116 can then automatically generate the testing script 118 in accordance with the specified settings and based on the sample set 106.

For example, the script generator 116 can determine how many times each physical object in the sample set 106 was obtained in the prior timeframe associated with the sample set 106. From this information, the script generator 116 can determine the proportion at which each physical object was obtained relative to the other physical objects. The script generator 116 can then include each of the physical objects in the same or similar proportions in the test script 118, so that the physical objects are obtained during the physical experiment in the same or similar proportions that they were obtained during the prior timeframe. As another example, the script generator 116 can determine a total number of the physical objects that should be obtained during the physical experiment based on a selected duration of the experiment and/or a selected demand level, both of which can be settings input by the user 124. As yet another example, the script generator 116 can determine that it should exclude certain kinds of physical objects from the physical experiment depending on the settings input by the user 124. For instance, the user 124 may choose to exclude all physical objects associated with a certain station, such as a warming station. So, the script generator 116 may exclude such physical objects from the test script 118. As still another example, the script generator 116 can define the channel(s) through which some or all of the physical objects should be obtained during the physical experiment based on the settings input by the user 124.

After generating the testing script 118, the computing system 102 can output the testing script 118 for use by one or more testers 128 (e.g., human testers or robotic testers) to conduct one or more physical experiments in a physical test environment 126. For example, the computing system 102 can transmit the testing script 118 to the testers 128 or to the user 124, which in turn can provide the testing script 118 to the testers 128. The testers 128 can be physically positioned in the physical test environment 126. The physical test environment 126 may be distinct from and exclude the computing system 102. The physical test environment 126 may also be different than the real locations 110. For instance, the physical test environment 126 may not be a real location that is consumer-facing; rather, the physical test environment 126 may be a simulated manufacturing environment.

The physical test environment 126 can include any number and arrangement of physical equipment 130 for use in conducting the experiments. For example, the physical test environment 126 can include a configuration of physical equipment 130 that is designed to replicate an actual configuration or a proposed configuration of physical equipment 130 in a real manufacturing location. This can allow the physical test environment 126 can be used as a proxy for the real manufacturing location for testing purposes. As one specific example, the physical test environment 126 can be designed to simulate a coffee shop. In some such examples, the physical test environment 126 may include bean grinders, espresso machines, mixers, sinks, refrigerators, ice boxes, ovens, microwaves, and other kitchen appliances. Those appliances can be connected and arranged in the physical test environment 126 as they would be in the real coffee shop, so that the physical test environment 126 can serve as a suitable proxy for the real coffee shop. The physical test environment 126 may also include countertops, seats, display cases, and other furniture to simulate a coffee shop environment.

The testers 128 can follow the testing script 118 to implement one or more physical experiments. For example, the testers 128 can perform physical activities in a sequence defined in the testing script to implement the physical experiment. The physical activities can mimic similar activities in a real manufacturing location. Examples of the physical activities can include mixing ingredients together (e.g., chemicals or drink ingredients), affixing circuit components to a printed circuit board, or otherwise combining components together. Other examples of the physical activities can include cleaning tasks, operating certain machinery, or simulating transactions. For instance, the physical activities can involve simulating a transaction for obtaining a physical object from a manufacturing location.

As the testers 128 conduct a physical experiment, sensors 132 may automatically capture data related to the physical experiment. The sensors 132 can be positioned at one or more locations in the physical test environment 126 to collect the data. Examples of the sensors 132 can include cameras, barcode scanners, flowrate sensors, depth sensors, inclinometers, accelerometers, global positioning system (GPS) units, infrared sensors, proximity sensors, pressure sensors, ultrasonic transducers, thermometers, gyroscopes, humidity sensors, level sensors, photo detectors, capacitive sensors, or any combination of these. The sensors 132 can provide sensor data 134 to the computing system 102 for further evaluation.

As one specific example, the physical test environment 126 can include a barcode scanning system that has two or more barcode scanners (e.g., QR code scanners) arranged at two or more stations in a simulated store. As part of the physical experiment, a group of testers 128 can work together to simulate the process for making and delivering a drink to a customer. This can be a sequential process in which each tester 128 performs a specific task with respect to the drink and then passes the drink on to the next tester in the chain. As each tester 128 in the chain receives the drink, the tester 128 can scan the drink's barcode. This can allow the drink to be tracked along its journey, which can be useful in deriving certain metrics (e.g., how long each part of the journey took). As another example, the physical test environment 126 can include one or more cameras. The cameras can be used to perform object tracking or other tasks. For instance, the cameras can be used to automatically track the physical location of a drink throughout its journey in the simulated store. This can help automate the process described above, so that each tester does not need to manually scan the drink's barcode. Other sensors may additionally or alternatively be used to collect relevant information about a physical experiment.

The testers 128 may also manually take measurements during a physical experiment and provide them as input to the computing system 102. For example, the testers 128 may manually log the start time and end time of the experiment, the temperature of a drink or food item at various points along its journey to a customer, and/or other information. The testers 128 can then input these measurements to the computing system 102 for further evaluation.

The computing system 102 can receive the sensor data 134 and/or other inputs from the testers 128 and provide them to an analysis engine 136. The analysis engine 136 can analyze these inputs to generate one or more metrics 138 (e.g., performance metrics) related to the physical experiment. The metrics 138 can provide insights about the physical experiment. For example, the metrics 138 may indicate the amount of time that it took to complete each type of order (e.g., drive thru order, in-store order, digital order, etc.) placed during the physical experiment. As another example, the metrics 138 may indicate the average temperature of a hot drink or a cold drink when it reaches the customer. As yet another example, the metrics 138 may indicate which ingredient is depleted the fastest under normal operating conditions. This may determined by tracking the amount of each ingredient that is present over the course of the physical experiment. The amount of each ingredient may be automatically tracked using the sensors 132.

In some examples, the analysis engine 136 can employ one or more machine-learning models to conduct its analysis. For example, the analysis engine 136 can include a neural network, such as a deep neural network. Additionally or alternatively, the analysis engine 136 can include a classifier or clusterer, such as a Naive Bayes classifier or a k-means clusterer. Such machine-learning models can be trained using one or more sets of labeled and/or unlabeled training data. For example, the machine-learning models can be trained using a labeled training dataset by applying a supervised learning process. Training a machine-learning model may involve executing thousands or millions of training iterations to adjust weights associated with the model, to thereby transform the model from an untrained state to a trained state. Once trained, the one or more machine-learning models can receive the inputs (e.g., the sensor data 134 and/or manual measurements) and provide the metrics 138 as outputs.

After generating the metrics, the computing system 102 can provide the metrics 138 to a user, such as the user 124 or another user. For example, the computing system 102 can output the metrics 138 on a display to the user. Based on the metrics 138, the user can make informed decisions and troubleshoot problems. This can help avoid issues at real manufacturing locations.

Figure 2:
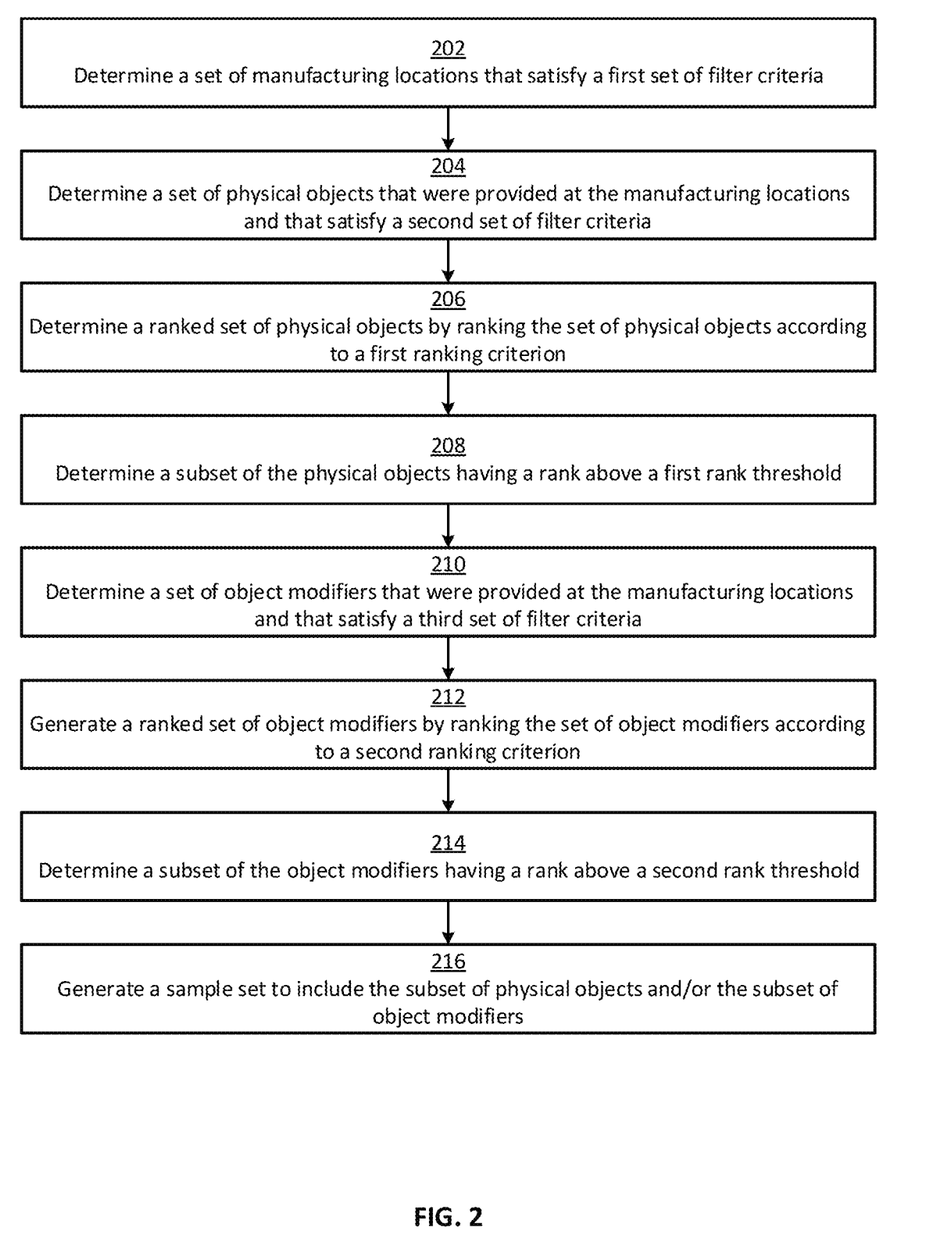
FIG. 2 shows an example of a process for generating sample data for use in script generation according to some aspects of the present disclosure.

Turning now to FIG. 2, shown is an example of a process for generating sample data for use in script generation according to some aspects of the present disclosure. Other examples may involve more operations, fewer operations, different operations, or a different sequence of operations than is shown. The operations of FIG. 2 are described below with reference to the components of FIG. 1 above.

In block 202, the computing system 102 determines a set of manufacturing locations (e.g., stores) that satisfy a first set of filter criteria. For example, the computing system 102 can analyze attributes of a group of manufacturing locations to determine whether each of the manufacturing locations satisfies the first set of filter criteria. The computing system 102 can determine the attributes based at least in part on demand data 108 from the group of manufacturing locations. Examples of the first set of filter criteria can include whether the manufacturing location is geographically located in a predefined region, such as the United states; whether the manufacturing location is currently active/open; whether the manufacturing location has been open for at least a predefined time period, such as 365 days; whether the manufacturing location has performed at least a predefined number of transactions in a predefined time period, such as at least 1000 transactions in the last 365 days; or any combination of these. If a manufacturing location satisfies the first set of filter criteria, the manufacturing location and its attributes can be added to the set of manufacturing locations, which may be stored in a data table or another data structure.

In block 204, the computing system 102 determines a set of physical objects that were provided by the manufacturing locations and satisfy a second set of filter criteria. For example, the computing system 102 can analyze attributes of a physical objects sold at manufacturing locations to determine whether each of the physical objects satisfies the second set of filter criteria. The computing system 102 can determine which physical objects to analyze and their attributes based on the demand data 108. Examples of the second set of filter criteria can include whether the physical object was part of a transaction within a predefined time period, such as the last 365 days; whether the physical object is a parent item (e.g., a default physical object that is not modified by an object modifier); whether the physical object is an active object currently being offered at the set of manufacturing locations; whether the physical object constitutes a "core" offering, as predesignated by a user; or any combination of these. If a physical object satisfies the second set of filter criteria, the physical object can be added to the set of physical objects, which may be stored as a data table or another data structure.

In block 206, the computing system 102 determines a ranked set of physical objects by ranking the set of physical objects according to a first ranking criterion. For example, the computing system 102 can rank the set of physical objects by the quantity provided during a particular time period, such as the last 365 days.

In block 208, the computing system 102 determines a subset of the physical objects that have a rank above a first rank threshold. For example, the computing system 102 can select a subset of the physical objects, from among the ranked set of physical objects, that have a rank that meets or exceeds the first rank threshold. As one particular example, the computing system 102 can select physical objects that have a rank that is in the upper 90%.

In block 210, the computing system 102 determines a set of object modifiers that were provided at the manufacturing locations and that satisfy a third set of filter criteria. For example, the computing system 102 can analyze attributes of a group of object modifiers to determine whether each of object modifiers satisfies the third set of filter criteria. The computing system 102 can determine the group of object modifiers to analyze and their attributes based on the demand data 108. Examples of the third set of filter criteria can include whether the object modifier was part of a transaction within a predefined time period, such as the last 365 days; whether the object modifier is an active object modifier currently being offered at the set of manufacturing locations; or any combination of these. If an object modifier satisfies the third set of filter criteria, the object modifier and its attributes can be added to the set of object modifiers, which may be stored in a data table or another data structure.

In block 212, the computing system 102 generates a ranked set of object modifiers by ranking the set of object modifiers according to a second ranking criterion, which may be the same as or different than the first ranking criterion. For example, the computing system 102 can rank the set of object modifiers by the quantity provided during a particular time period, such as the last 365 days.

In block 214, the computing system 102 determines a subset of the object modifiers that have a rank above a second rank threshold, which may be the same as or different than the first rank threshold. For example, the computing system 102 can select a subset of the object modifiers, from among the ranked set of object modifiers, that have a rank that meets or exceeds the second rank threshold. As one particular example, the computing system 102 can select object modifiers that have a rank that is in the upper 90%.

In block 216, the computing system 102 generates a sample set 106 based on the subset of physical objects and/or the subset of object modifiers. For example, the sample set 106 can include the subset of physical objects and/or the subset of object modifiers. As a result of this process, the computing system 102 may generate a sample set 106 that includes the top X (e.g., 90%) of physical objects and the top Y (e.g., 90%) of object modifiers, which may be the most frequently provided physical objects and object modifiers at the set of manufacturing locations.

Figure 3:
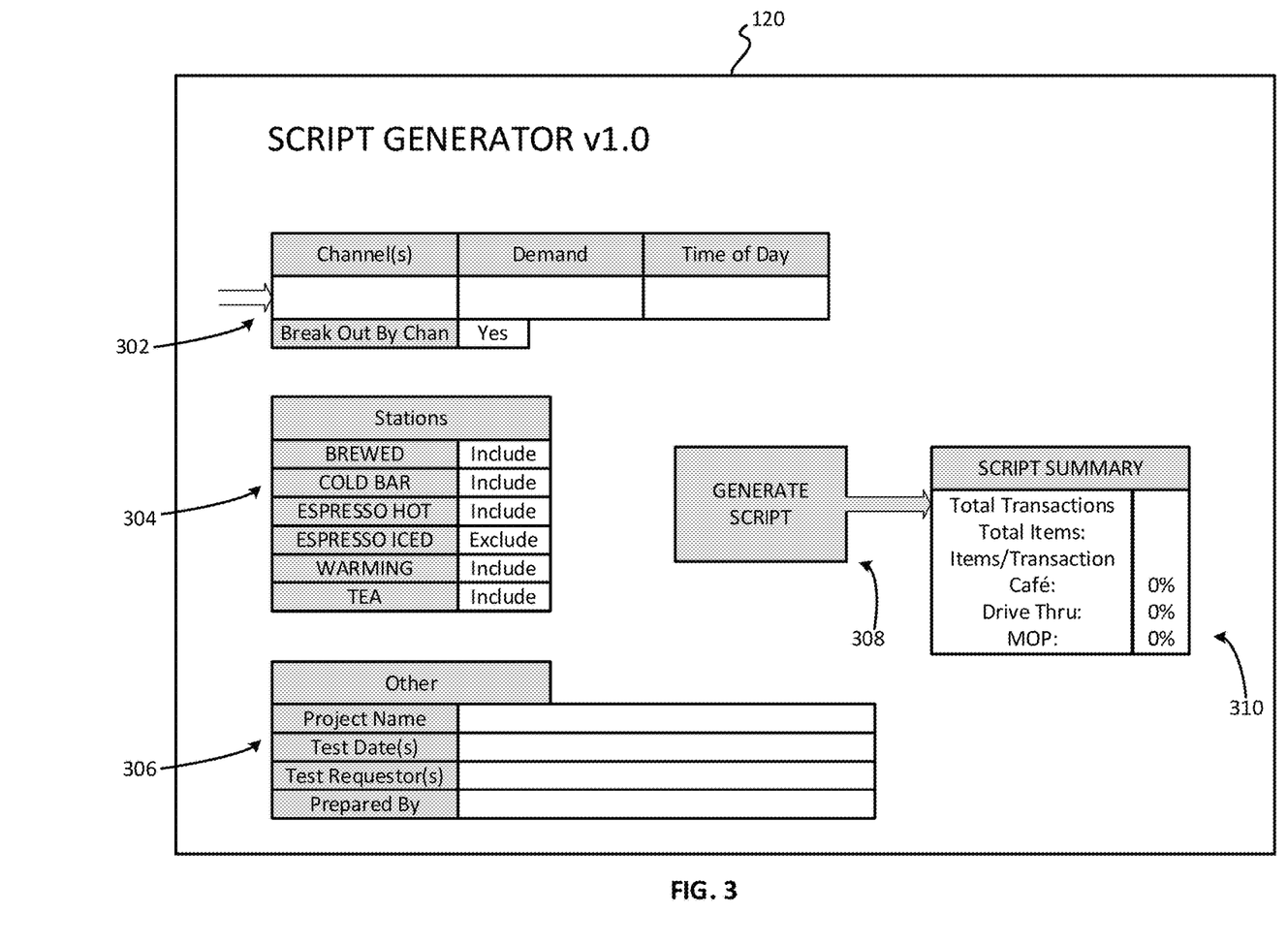
FIG. 3 shows an example of a graphical user interface for customizing a testing script according to some aspects of the present disclosure.

Turning now to FIG. 3, shown is an example of a graphical user interface (GUI) 120 for customizing a testing script according to some aspects of the present disclosure. As shown, the GUI 120 includes graphical options. The graphical options can include pulldown lists, text fields, radio buttons, check boxes, and/or other graphical input elements through which a user can input settings for a testing script.

More specifically, the GUI 120 includes a first set of graphical options 302. The first set of graphical options 302 can include a "channel" setting, which allows a user to select a transaction channel to simulate in a physical experiment. There may be different transaction channel options from which the user can select a desired transaction channel. A transaction channel is a channel through which a transaction can take place. Examples of such transaction channels can include an in-store register, a mobile application, a website-based order system, or an in-store self-serve kiosk.

Additionally or alternatively, the first set of graphical options 302 can include a "demand" setting, which allows the user to select a demand level to simulate in a physical experiment. There may be different demand level options (e.g., low, medium, high, or ultra) from which the user can select a desired demand level. It may be desirable to use different demand settings to simulate different events (e.g., holidays or promos) in a physical experiment, where the events may have higher or lower demand levels relative to a baseline.

Additionally or alternatively, the first set of graphical options 302 can also include a "time of day" setting, which allows the user to select a time of day to simulate in a physical experiment. It may be desirable to use different time settings to simulate different time periods that may have higher or lower demand levels, such as from 6-9 AM and 3-5 PM.

In addition to the first set of graphical options 302, the GUI 120 can include a second set of graphical options 304. The second set of graphical options 304 can include a "station" setting, which allows the user to select which stations to include in the physical experiment. A station can be a physical space in a manufacturing location at which certain tasks are performed. Each station can be configured for performing different tasks than the other stations. It may be desirable to include or exclude certain stations from the physical experiment, depending on the goal of the experiment and the time allotted to the experiment.

In some examples, the GUI 120 can include a third set of graphical options 306. The third set of graphical options 306 can include input fields for entering an experiment name, a test date on which the experiment is to be conducted, or an identifier of the test requestor. The GUI 120 may additionally or alternatively have other graphical options, besides what is shown in FIG. 3, for allowing the user to input other instructions or metadata related to the physical experiment.

Once the user has input their desired settings, the user can select a button 308 to cause the script generator to automatically generate a testing script that is consistent with the selected settings. Details about the generated script can then be output in the graphical user interface 120, for example in the summary box 310.

Figure 4:
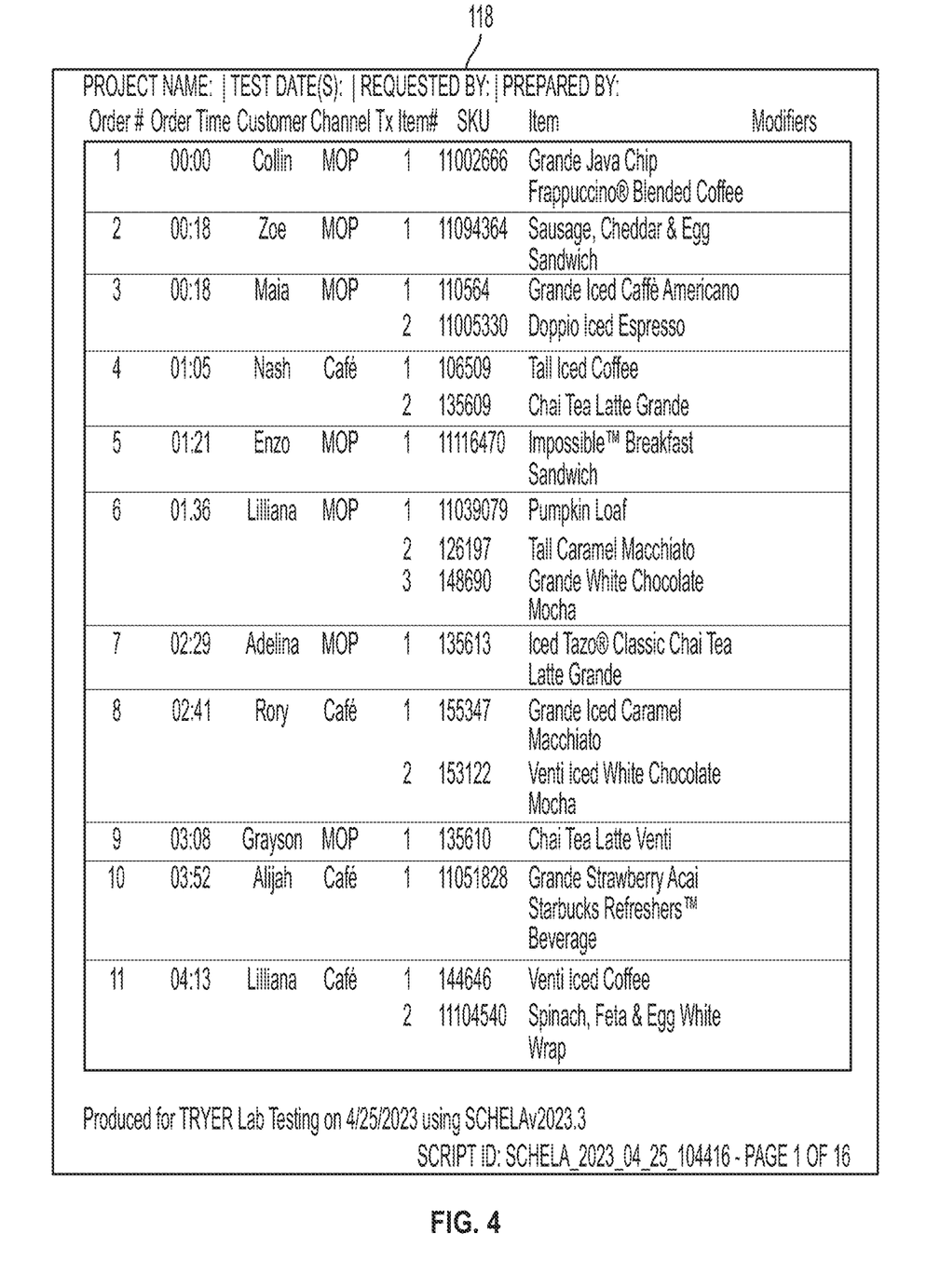
FIG. 4 shows an example of a testing script according to some aspects of the present disclosure.

FIG. 4 shows an example of a testing script 118 according to some aspects of the present disclosure. The testing script 118 can include a table indicating a sequence of activities to be performed during a physical experiment. Each activity can be described in its own row in the table along with various details about the activity. A tester may physically perform each activity described in the testing script 118 during the experiment. For example, if the activities include obtaining objects, the test script 118 can indicate which physical objects to obtain, how many of each physical object to obtain over the course of the experiment, and a sequence in which to obtain those physical objects over the course of the experiment.

In this example, the testing script 118 relates to performing a physical experiment in a simulated store. Each activity involves conducting a transaction via a certain channel by a certain customer at a certain time. A transaction can involve obtaining one or more physical objects, such as breakfast sandwiches, teas, and/or coffees. Some of the transactions may also involve applying a modifier to a selected physical object, for example by adding an extra ingredient to the physical object or removing a default ingredient from the physical object. One or more testers can follow the testing script 118 to obtain those physical object in the appropriate order, for example by engaging in simulated buys of the physical objects in the sequential order defined in the test script 118. Other examples may involve test scripts 118 that contain other types of activities, depending on the application.

Figure 5:
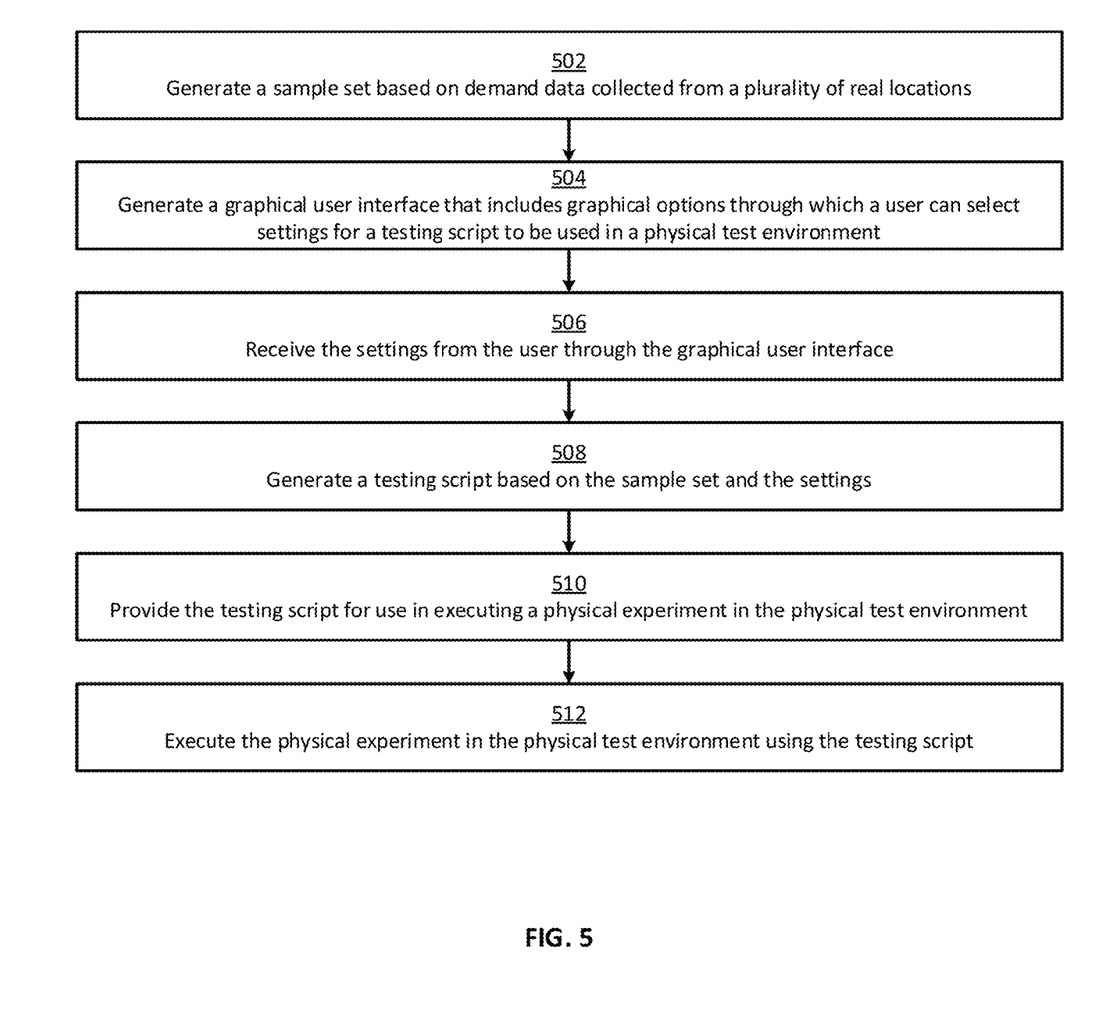
FIG. 5 shows a flowchart of an example of a process for performing physical experiments based on automatically-generated testing scripts according to some aspects of the present disclosure.

Turning now to FIG. 5, shown is a flowchart of an example of a process for performing physical experiments based on automatically-generated testing scripts according to some aspects of the present disclosure. Other examples may include more operations, fewer operations, different operations, or a different sequence of operations than is shown. The operations of FIG. 5 are described below with reference to the components of FIG. 1 above.

In block 502, a computing system 102 generates a sample set 106 based on demand data 108 collected from a plurality of real locations 110. This may involve performing some or all of the operations described above with respect to FIGS. 1-2. The sample set 106 can be generated by a sample generator 104, which can be software executed on the computing system 102.

In block 504, the computing system 102 generates a graphical user interface 120 that includes graphical options 122 through which a user 124 can select settings for a testing script 118 to be used in a physical test environment 126. In some examples, the graphical user interface 120 can be generated by a script generator 116, which can be software executed on the computing system 102. The computing system 102 may output the graphical user interface 120 for display on a display device. The user 124 can then view the graphical user interface 120 via the display device and input the settings.

In block 506, the computing system 102 receives the settings from the user 124 through the graphical user interface 120. For example, the user 124 can input the settings to the computing system 102 via the graphical user interface 120.

In block 508, the computing system 102 generates a testing script 118 based on the sample set 106 and the settings. This may involve providing the sample set 106 and the settings as input to the script generator 116, which can generate and output the corresponding testing script 118.

In block 510, the computing system 102 provides the testing script 118 for use in executing a physical experiment in the physical test environment 126. For example, the computing system 102 can transmit the testing script 118 to one or more testers 128, who can perform the physical experiment in the physical test environment 126. As another example, the computing system 102 can transmit the testing script 118 to the user 124, who can provide it to the testers 128 that perform the physical experiment in the physical test environment 126. Transmitting the testing script 118 to a user can involve outputting the testing script on a display device for viewing by the user, printing the testing script 118 for delivery to the user, and/or transmitting an electronic communication that includes the testing script 118 over one or more networks (e.g., the Internet) to a user device of the user. Examples of the user device can include a laptop computer, desktop computer, mobile phone, tablet, e-reader, or wearable device such as a smart watch.

In block 512, the testers 128 execute the physical experiment in the physical test environment 126 using the testing script 118. This may involve operating one or more pieces of physical equipment 130 in accordance with the testing script 118. In some examples, sensors 132 may be used to take various measurements during the physical experiment, which can be used to monitor the progress of the physical experiment and/or determine metrics 138 related to the physical experiment. The sensors 132 may include any one or more of the sensors described above, such as a multi-camera system capable of performing stereo vision processing.

Figure 6:
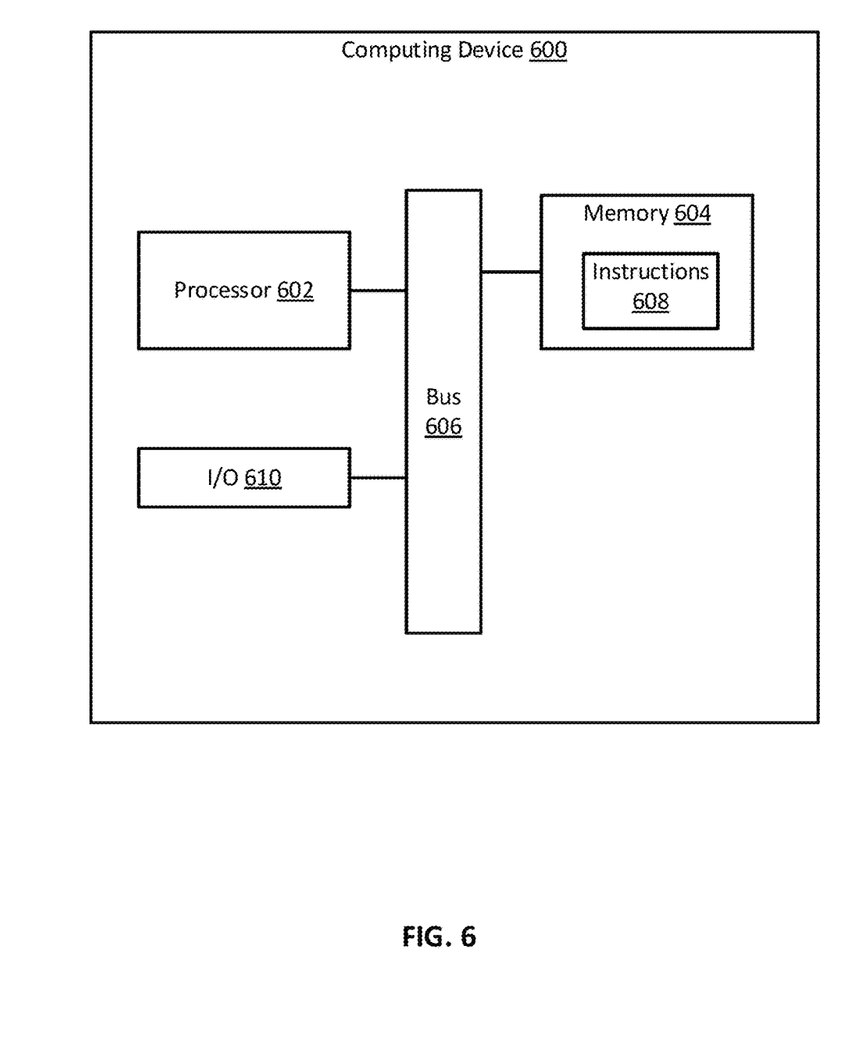
FIG. 6 shows a block diagram for an example of a computing device usable to implement some aspects of the present disclosure.

FIG. 6 shows a block diagram for an example of a computing device 600 usable to implement some aspects of the present disclosure. In some examples, the computing device 600 may be part of the computing system 102 of FIG. 1.

The computing device 600 includes a processor 602 coupled to a memory 604 via a bus 606. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 608 stored in the memory 604 to perform operations. Examples of such operations can include any of the operations described above with respect to the computing system 102. In some examples, the instructions 608 can include processor-specific instructions generated by a compiler or an interpreter from code written in any suitable computer-programming language, such as C, C++, C #, Python, or Java.

The memory 604 can include one memory device or multiple memory devices. The memory 604 can be volatile or non-volatile, such that the memory 604 retains stored information when powered off. Examples of the memory 604 include electrically erasable and programmable read-only memory (EEPROM), flash memory, or any other type of non-volatile memory. At least some of the memory device can include a non-transitory computer-readable medium from which the processor 602 can read instructions 608. A computer-readable medium can include electronic, optical, magnetic, or other storage devices capable of providing the processor 602 with computer-readable instructions or other program code. Examples of a computer-readable medium can include magnetic disks, memory chips, ROM, random-access memory (RAM), an ASIC, a configured processor, optical storage, or any other medium from which a computer processor can read the instructions 608.

The computing device 600 may also include input and output (I/O) components 610. Examples of the input components can include a mouse, a keyboard, a microphone, a trackball, a touch pad, a touch-screen display, or any combination of these. Examples of the output components can include a visual display such as a LCD display or a touch-screen display; an audio display such as speakers; a haptic display such as a piezoelectric device or an eccentric rotating mass (ERM) device; or any combination of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A method comprising:
    generating, by the one or more processors, a graphical user interface that includes graphical options through which a user can select settings for a testing script to be used in a physical test environment;
    receiving, by the one or more processors, the settings from the user through the graphical user interface;
    generating, by the one or more processors, the testing script based on historical sales data and the settings, wherein the historical sales data indicates sales of physical objects at a plurality of stores over a prior time window; and
    providing, by the one or more processors, the testing script for use in executing a physical experiment in the physical test environment.

2. The method of claim 1, further comprising:
    receiving sensor data from a plurality of sensors positioned in the physical test environment;
    processing the sensor data to determine metrics in relation to the physical experiment; and
    providing the metrics for display to one or more users in relation to the physical experiment.

3. The method of claim 2, wherein the plurality of sensors include a camera and a barcode scanning system.

4. The method of claim 3, wherein the physical experiment includes a set of simulated purchases of a set of physical objects, wherein the test script specifies the set of physical objects, and wherein the test script indicates how many of each physical object in the set of physical objects to simulated purchase during the physical experiment.

5. The method of claim 1, wherein the physical test environment is a simulated manufacturing environment, and wherein the physical experiment involves stimulating physical activity in the simulated manufacturing environment.

6. The method of claim 1, wherein the graphical options in the graphical user interface include a first option for allowing the user to select a sales channel to simulate, a second option for allowing the user to select a sales demand level to simulate, and a third option for allowing the user to select a time of day to simulate.

7. The method of claim 1, further comprising:
    executing the physical experiment in the physical test environment using the test script.

8. The method of claim 1, further comprising:
generating a sample set from the historical sales data by:
selecting a plurality of physical objects, described in the historical sales data, that satisfy a first filter criterion;
selecting a plurality of object modifiers, described in the historical sales data, that satisfy a second filter criteria;
generating the sample set to include at least some of the plurality of physical objects and at least some of the plurality of object modifiers; and
generating the testing script based on the sample set.

9. The method of claim 1, wherein the testing script configured to be used by a human for executing the physical experiment in the physical test environment.

10. A system comprising:
one or more processors; and
one or more memories including instructions that are executable by the one or more processors for causing the one or more processors to:
generate a graphical user interface that includes graphical options through which a user can select settings for a testing script to be used in a physical test environment;
receive the settings from the user through the graphical user interface;
generate the testing script based on historical sales data and the settings, wherein the historical sales data indicates sales of physical objects at a plurality of stores over a prior time window; and
provide the testing script for use in executing a physical experiment in the physical test environment.

11. The system of claim 10, wherein the one or more memories further include instructions that are executable by the one or more processors for causing the one or more processors to:
receive sensor data from a plurality of sensors positioned in the physical test environment;
process the sensor data to determine metrics in relation to the physical experiment; and
provide the metrics for display to one or more users in relation to the physical experiment.

12. The system of claim 11, wherein the plurality of sensors include a camera.

13. The system of claim 10, wherein the physical test environment is a simulated manufacturing environment, and wherein the physical experiment involves stimulating physical activity in the simulated manufacturing environment.

14. The system of claim 10, wherein the physical experiment includes a set of simulated purchases of a set of physical objects, wherein the test script specifies the set of physical objects, and wherein the test script indicates how many of each physical object in the set of physical objects to simulated purchase during the physical experiment.

15. The system of claim 10, wherein the graphical options in the graphical user interface include a first option for allowing the user to select a channel to simulate, a second option for allowing the user to select a demand level to simulate, and a third option for allowing the user to select a time of day to simulate.

16. The system of claim 10, wherein the one or more memories further include instructions that are executable by the one or more processors for causing the one or more processors to:
generate a sample set from the historical sales data by:
selecting a plurality of physical objects, described in the historical sales data, that satisfy a first filter criterion;
selecting a plurality of object modifiers, described in the historical sales data, that satisfy a second filter criteria;
generating the sample set to include at least some of the plurality of physical objects and at least some of the plurality of object modifiers; and
generate the testing script based on the sample set.

17. A non-transitory computer-readable medium comprising program code that is executable by one or more processors for causing the one or more processors to:
generate a sample set based on historical sales data collected from a plurality of stores, the historical sales data indicating sales of physical objects at the plurality of stores over a prior time window;
generate a graphical user interface that includes graphical options through which a user can select settings for a testing script to be used in a physical test environment;
receive the settings from the user through the graphical user interface;
generate the testing script based on the sample set and the settings, wherein the testing script indicates a sequence of simulated purchases of the physical objects to make in the physical test environment; and
provide the testing script for use in executing a physical experiment in the physical test environment, wherein the physical experiment involves performing the sequence of simulated purchases of the physical objects in the physical test environment.

18. The non-transitory computer-readable medium of claim 17, wherein the physical test environment is a simulated manufacturing environment.

19. The non-transitory computer-readable medium of claim 17, wherein the test script specifies a set of physical objects that are to undergo the sequence of simulated purchases, and wherein the test script indicates how many of each physical object in the set of physical objects to simulated purchase during the physical experiment.

20. The non-transitory computer-readable medium of claim 17, wherein the graphical options in the graphical user interface include a first option for allowing the user to select a channel to simulate, a second option for allowing the user to select a demand level to simulate, or a third option for allowing the user to select a time of day to simulate.

21. The non-transitory computer-readable medium of claim 17, further comprising program code that is executable by the one or more processors for causing the one or more processors to:
generate the sample set from the historical sales data by:
selecting a plurality of physical objects, described in the historical sales data, that satisfy a first filter criterion;
selecting a plurality of object modifiers, described in the historical sales data, that satisfy a second filter criteria;
generating the sample set to include at least some of the plurality of physical objects and at least some of the plurality of object modifiers; and
generate the testing script based on the sample set.

* * * * *